(12) United States Patent
Hewins et al.

(10) Patent No.: US 8,777,799 B2
(45) Date of Patent: Jul. 15, 2014

(54) AXLE C-WASHER AND SHIM RETAINING DEVICE

(75) Inventors: Adam Hewins, Cambridge (GB); Nicholas Arden, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 1194 days.

(21) Appl. No.: 12/614,101

(22) Filed: Nov. 6, 2009

(65) Prior Publication Data

US 2010/0255948 A1  Oct. 7, 2010

Related U.S. Application Data

(60) Provisional application No. 61/211,719, filed on Apr. 1, 2009.

(51) Int. Cl.
  *F16H 48/06* (2006.01)
  *F16H 57/08* (2006.01)
  *F16H 48/08* (2006.01)
  *F16H 48/40* (2012.01)

(52) U.S. Cl.
  CPC .......... *F16H 48/08* (2013.01); *F16H 2048/082* (2013.01); *F16H 2048/405* (2013.01); *F16H 2048/085* (2013.01)
  USPC .......................................... 475/331; 475/230

(58) Field of Classification Search
  USPC .......................................... 475/230–247, 331
  See application file for complete search history.

(56) References Cited

U.S. PATENT DOCUMENTS

| | | | | |
|---|---|---|---|---|
| 1,508,832 A | * | 9/1924 | Zimmerschied et al. | 475/230 |
| 1,929,611 A | * | 10/1933 | Skinner | 74/366 |
| 2,865,229 A | * | 12/1958 | Hodanek | 475/230 |
| 3,115,790 A | * | 12/1963 | Logan et al. | 475/246 |
| 3,208,306 A | * | 9/1965 | Lewis | 475/235 |
| 3,310,999 A | * | 3/1967 | Griffith | 475/246 |
| 3,853,022 A | * | 12/1974 | Duer | 475/230 |
| 3,874,250 A | * | 4/1975 | Duer | 475/235 |
| 5,620,388 A | | 4/1997 | Schlegelmann et al. | 475/230 |
| 6,478,709 B1 | | 11/2002 | Irwin et al. | 475/230 |
| 6,497,027 B1 | | 12/2002 | Irwin | 29/407.01 |
| 6,618,924 B1 | | 9/2003 | Irwin | 29/407.05 |
| 6,997,842 B2 | * | 2/2006 | Atkinson et al. | 475/235 |
| 7,270,026 B2 | * | 9/2007 | Atkinson et al. | 74/424 |

* cited by examiner

*Primary Examiner* — Tisha Lewis
(74) *Attorney, Agent, or Firm* — L.C. Begin & Associates, PLLC (57) ABSTRACT

In a differential mechanism including a pinion shaft and a pair of axle shafts spaced apart from the pinion shaft along axes of the axle shafts, a spacer is positioned between the pinion shaft and each of the axle shafts for controlling axial end play of the axle shafts. A retainer separate from the spacers is mounted on the pinion shaft for securing the spacers in position.

10 Claims, 9 Drawing Sheets

AXLE C-WASHER AND SHIM RETAINING DEVICE

CROSS-REFERENCE TO RELATED APPLICATIONS

This application is entitled to and claims the benefit of Provisional Patent Application Ser. No. 61/211,719, filed on Apr. 1, 2009.

BACKGROUND OF THE INVENTION

Embodiments of the invention described herein relate to differential systems for motor vehicles and, more particularly, to a method for controlling axle shaft endplay in a differential assembly.

In conventional drivelines, particularly those for rear wheel drive vehicles, left-hand and right-hand semi-float axle shafts extend laterally from a differential mechanism that includes side bevel gears in continuous meshing engagement with differential pinions supported rotatably on a pinion shaft carried on a differential carrier. The differential carrier is driven rotatably by a set of meshing bevel gears, one of which is driven by a drive shaft disposed substantially perpendicular to the axle shafts. The side bevel gears typically are connected rotatably to the axle shafts by a spline connection formed on a first shoulder near the inboard ends of the axle shafts. Each axle shaft carries a second shoulder proximate its axially innermost extremity, the second shoulder located adjacent the differential pinion shaft or cross pin.

Located between the shoulders on the axle shaft is an annular recess that is axially aligned with the recess formed on the corresponding side bevel gear. A retaining member (such as a C-washer or retainer ring), fitted within the recesses of the axle shaft and side bevel gear, engages the second shoulder to limit outward axial movement of the axle shaft relative to the side bevel gear. However, because the bevel gear recess that receives the retaining member is open at its axially innermost face, the retaining member may move along the shaft axis if there is clearance between the retaining member and the shaft second shoulder, and particularly if endplay exists between the innermost end of the shaft and the pinion shaft. This axial endplay permits the shaft to move along the spline connection axially inwardly toward the pinion shaft.

The end of the shaft also rubs against the pinion shaft during operation of the differential mechanism. A portion of this shaft end may be gradually worn away due to contact with the pinion shaft, thereby increasing axial end play of the shaft. In some cases, this wear is great enough to permit the shaft second shoulder to move an axial distance from the side bevel gear greater than the thickness of the retaining member. In this instance, the retaining member can fall out of the recess in the bevel gear and may no longer be positioned along the axle shaft.

SUMMARY OF THE INVENTION

In one aspect of the embodiments of the present invention, means are provided mounted on a pinion shaft of a differential mechanism for controlling axial end play of an axle shaft spaced apart from the pinion shaft.

In another aspect of the embodiments of the present invention, a device is provided for restricting movement of an axle shaft retaining member along an axle shaft. The device includes a retainer having a base and a plurality of members extending from the base.

In another aspect of the embodiments of the present invention, a method is provided for controlling axial end play of an axle shaft in a differential mechanism. The method includes the steps of providing means for positioning a spacer between an end of the axle shaft and a pinion shaft of the differential mechanism positioned opposite the axle shaft end, the means being mountable on the pinion shaft; providing a spacer configured for positioning in the positioning means; mounting the positioning means on the pinion shaft; positioning a spacer in the positioning means; and securing the spacer in the positioning means.

DETAILED DESCRIPTION

Figure 1:
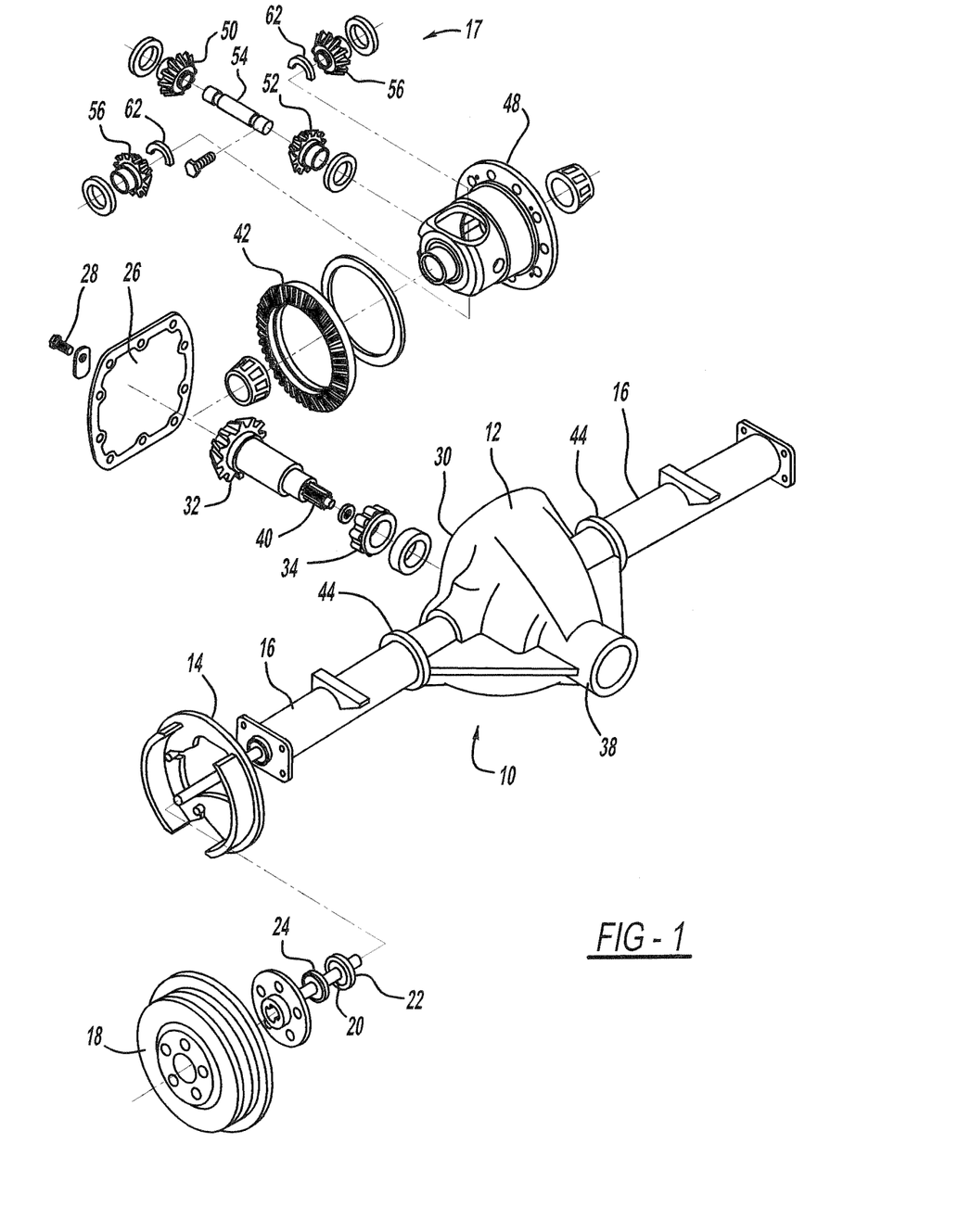
FIG. 1 is an exploded perspective view of an axle assembly including a differential assembly.
Figure 2:
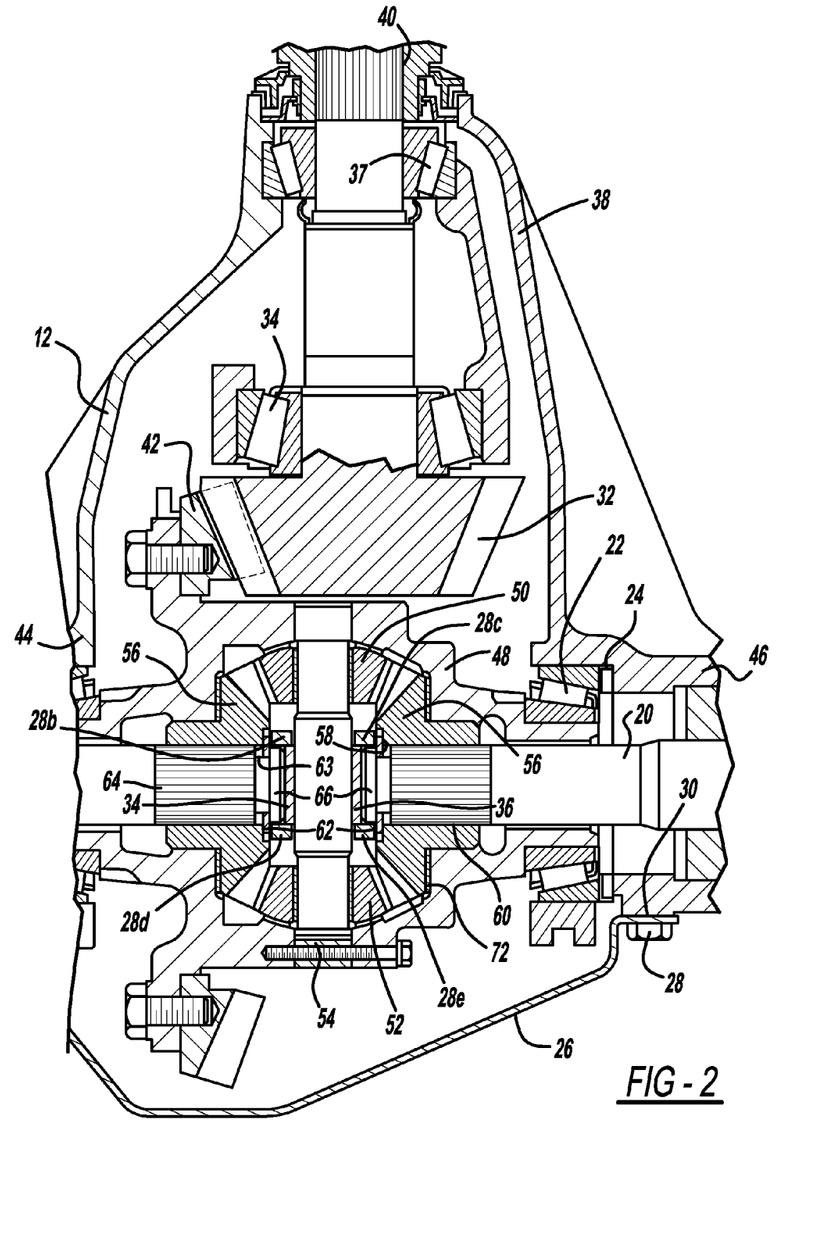
FIG. 2 is a cross section taken through the differential assembly of FIG. 1.

FIGS. 1 and 2 show an axle assembly 10 to which embodiments of the present invention can be applied. Axle assembly 10 is similar in construction to axle assemblies described in U.S. Pat. Nos. 6,618,924, 5,620,388, 6,497,027, and 6,478,709, each of which is incorporated herein by reference. Axle assembly 10 includes an axle housing 12, which contains a differential assembly 17 and a reservoir of hydraulic lubricant, a brake assembly 14 located at the end of an axle tube 16 extending outboard from the end of the axle housing 12, a brake drum 18, axle shafts 20, axle shaft bearings 22, and bearing seals 24. A cover 26 is connected by bolts 28 to a rear face 30 of the housing 12 to seal the lubricant within the housing 12.

Located within the axle housing 12 is a drive pinion 32 rotatably supported by a rear drive pinion bearing 34 and a front drive pinion bearing 37. Front drive pinion 35 is supported on an inner surface of an axle carrier casing 38 that extends forward from a center line of the axle assembly. A drive shaft (not shown), drivably connected to an output shaft of a transmission (not shown), is connected through splines 40 to a shaft that drives the drive pinion 32.

Operative coupling of the axle shafts to the differential assembly will be described for a single axle shaft 20 extending from one side of the axle housing. However, it will be understood that the axle shaft extending from the opposite side of the axle housing is operatively connected to the differential assembly in a similar manner.

The axle housing assembly 12 includes laterally directed tubular extensions 44, which receive therein the axle tubes 16.

Located within the axle housing 12 is a differential case 48 housing a differential mechanism. The differential mechanism includes a ring gear 42 in continuous meshing engagement with the drive pinion 32. The differential case 48 supports bevel pinion gears 50, 52 for rotation on a differential pinion shaft or cross pin 54. Side bevel gears 56 are in continuous meshing engagement with the pinions 50, 52 and are drivably connected to left and right axle shafts, located within the axle tubes 16.

Figure 3:
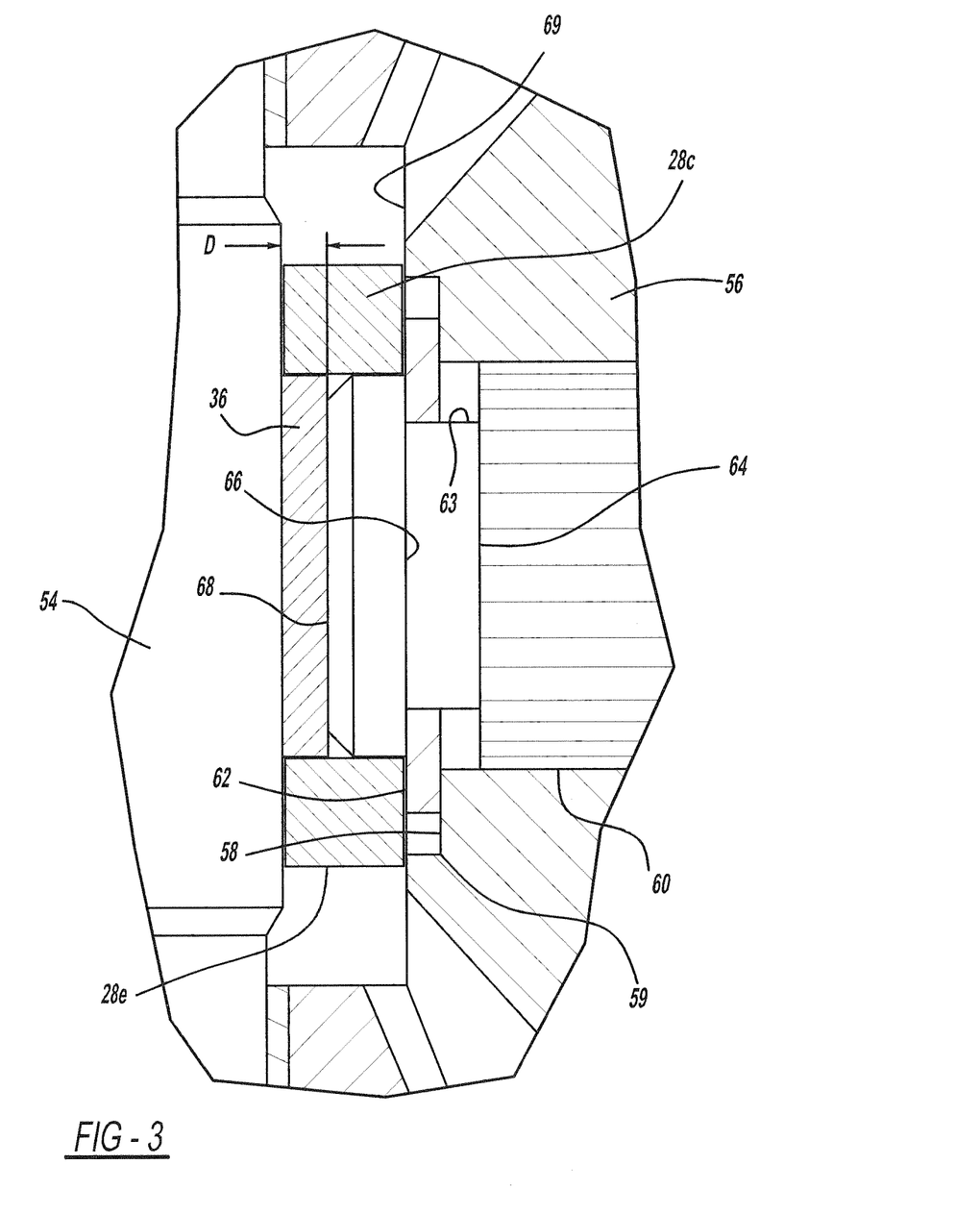
FIG. 3 is a magnified view of a portion of the assembly shown in FIG. 2.
Figure 4:
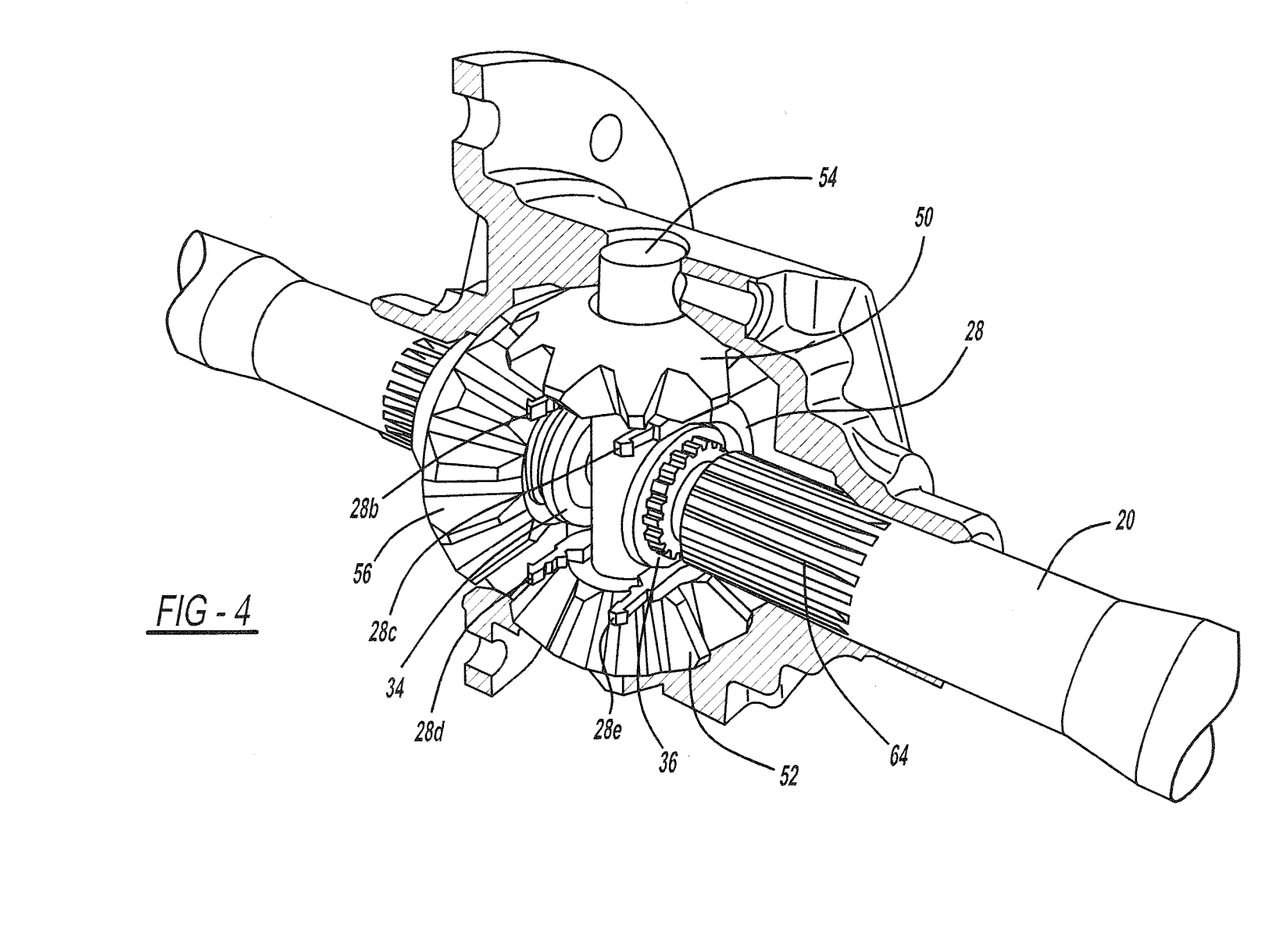
FIG. 4 is a perspective view of a portion of the differential assembly of FIG. 2 incorporating an axle C-washer and shim retaining device in accordance with an embodiment of the present invention.

Axle shaft 20 is connected by a spline 60 to the corresponding side bevel gear 56. A retaining member 62 (for example, a C-washer or a retaining ring), such as that shown in FIGS. 2 and 3, is fitted within an annular recess 63 formed on the axle shaft 20. Recess 63 is located between a first shoulder 64 formed proximate an inboard end of shaft 20, and a second shoulder 66 located opposite first shoulder 64. The retaining member 62 is provided for limiting outward axial movement of the axle shaft 20 relative to the side bevel gear 56 by abutting an end surface 58 of a recess 59 formed in gear 56. If desired, an amount of axial clearance between an axially innermost end surface of the shaft 20 and pinion shaft 54 may be provided to enable the shaft to move along the spline connection axially inwardly toward the pinion shaft. The distance the shaft is permitted to move between the axially innermost position of the shaft and a position where its outward axial motion is prevented by engagement between the second shoulder and the retaining member (i.e., the axially outermost position) is the shaft end play.

As illustrated in FIG. 3, a spacer or shim 36 may be positioned between the axle shaft and the pinion shaft as described below, to affect the amount of shaft end play. When the spacer is not present, the axle shaft endplay is an amount D of possible axial movement of the axle shaft 20 between its innermost position when an inboard contact face 68 of the axle shaft 20 is in contact with an outer cylindrical surface of the pinion shaft 54, and its outermost position when the shoulder 66 abuts the retaining member 62 and the retaining member 62 abuts the end surface 58 of the side gear recess. When there is a spacer 36 interposed between the axle shaft and the pinion shaft, the axial endplay is reduced to the distance between an axially outward face of spacer 36 and the outermost position of the shaft end face 68. If the spacer is dimensioned to occupy the entire distance between the axially outermost shaft end position and the pinion shaft 54, axial play of the shaft is essentially eliminated (as shown in FIG. 3).

Located between the shoulders 64 and 66 on the axle shaft is an annular recess 63 that is axially aligned with the recess 59 formed on the corresponding side bevel gear. A retaining member, such as a C-washer or retainer ring), fitted within the recesses of the axle shaft and side bevel gear, engages the second shoulder 66 to limit outward axial movement of the axle shaft relative to the side bevel gear. However, because the recess 59 formed on the bevel gear is open at its axially innermost face, the retaining member 62 may move along the shaft axis if there is clearance between the retaining member 62 and the shaft second shoulder 66, and particularly if endplay exists between the pinion shaft 54 and the innermost end surface 68 of shaft 20. This axial endplay permits the shaft 20 to move along the spline connection axially inwardly toward the pinion shaft 54.

In accordance with embodiments of the present invention, a retainer assembly is provided for preventing shaft retaining member 62 from exiting recess 59 during operation of the differential assembly. The retaining device also enables securement thereto of a spacer or shim positioned between the axle shaft 20 and the pinion shaft, for controlling axial endplay of the axle shaft.

Figure 5:
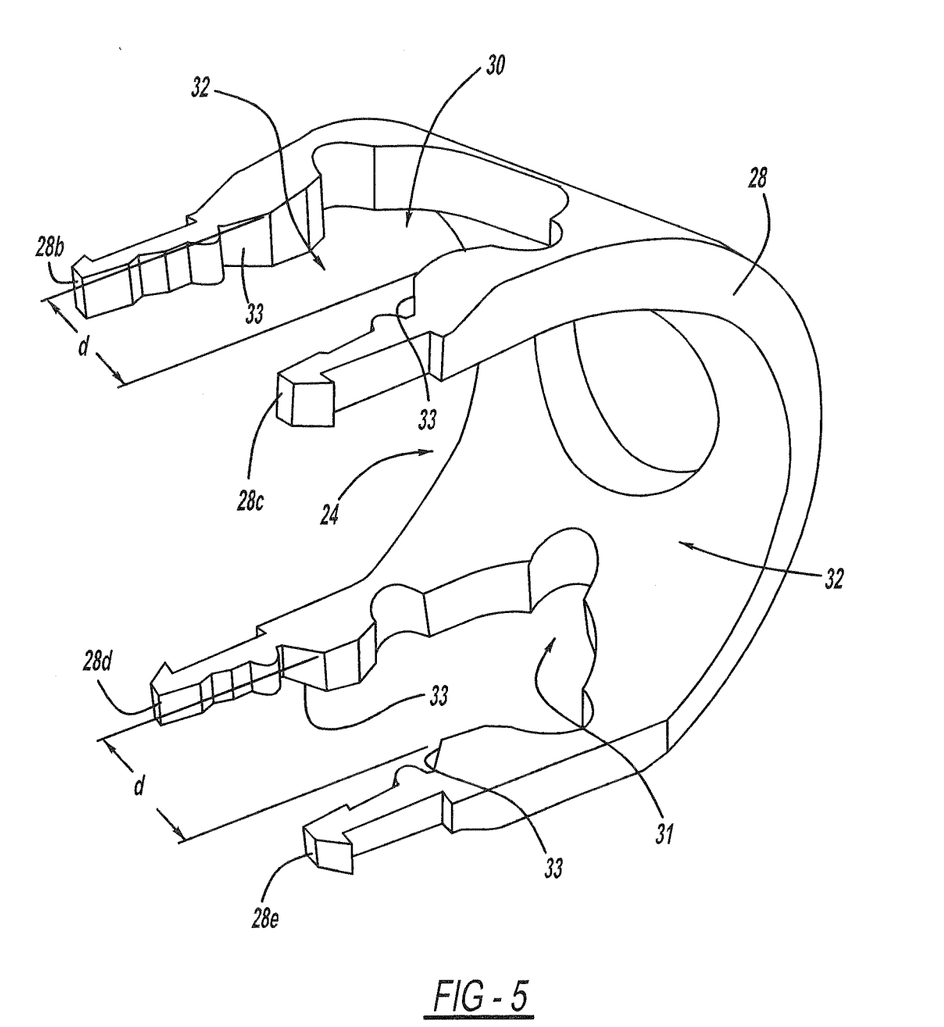
FIG. 5 is a perspective view of a retainer in accordance with an embodiment of the present invention.
Figure 6:
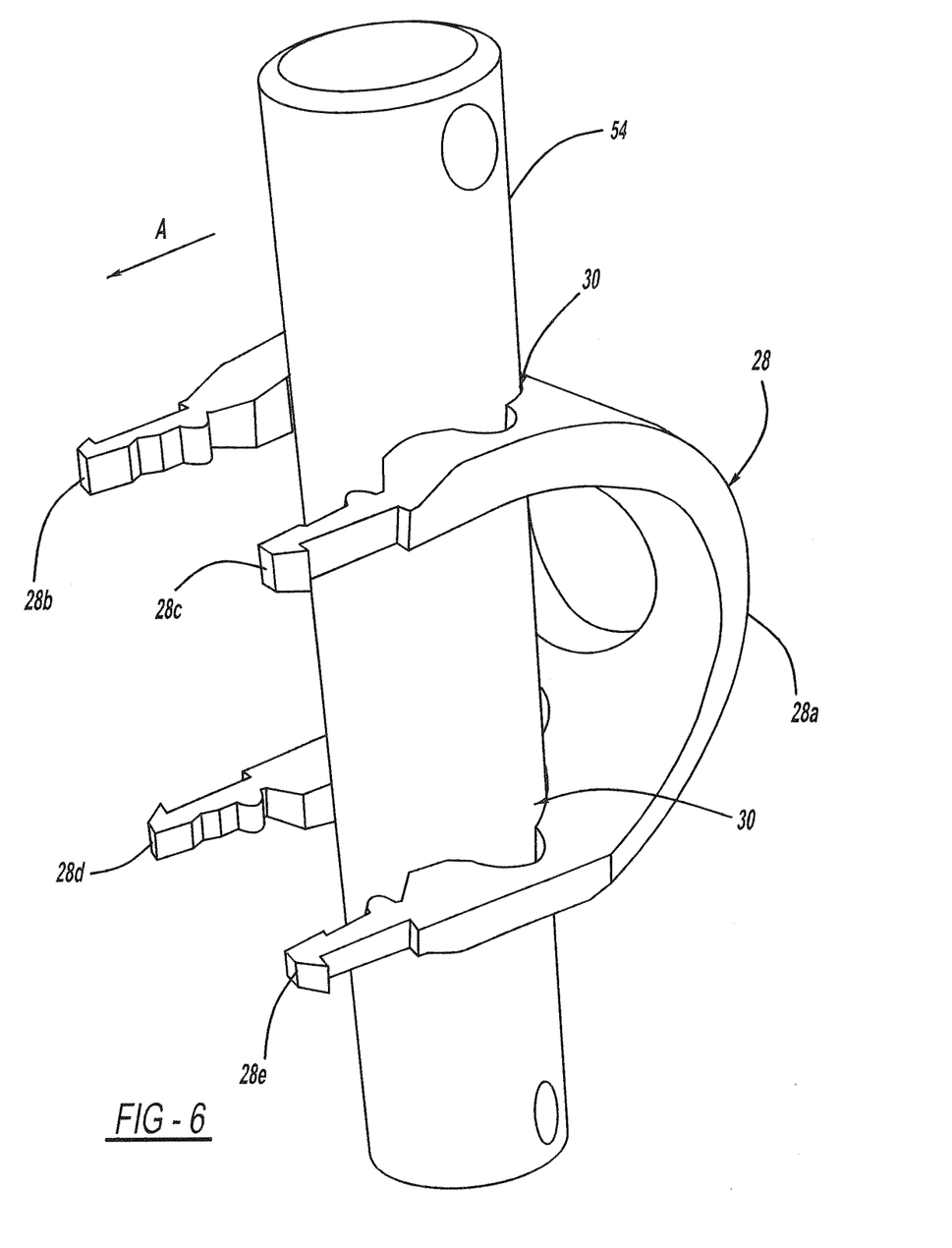
FIG. 6 is a perspective view of the retainer of FIG. 5 attached to a pinion shaft of a differential assembly.
Figure 7:
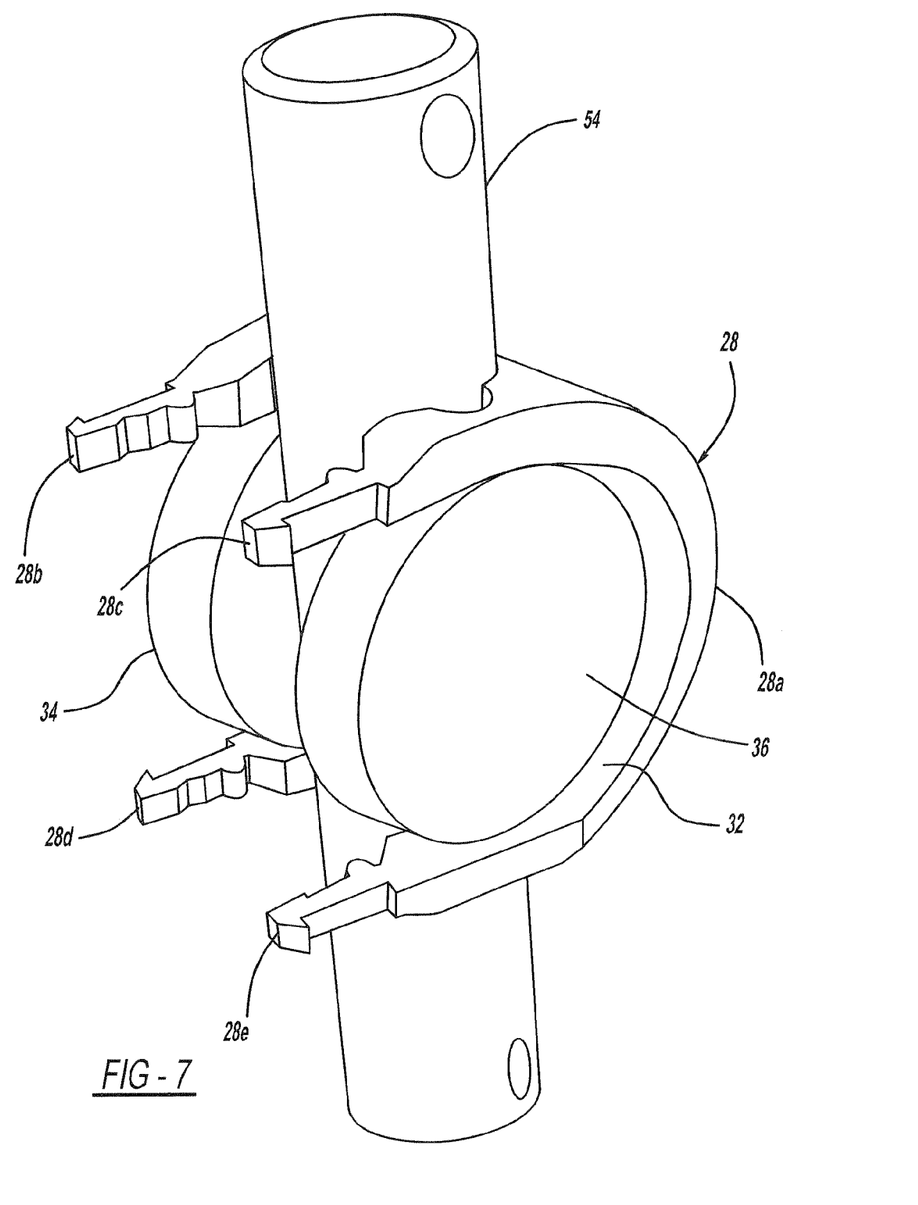
FIG. 7 is the perspective view of FIG. 6 showing a pair of shims mounted in the retainer.

Referring to FIGS. 2-8, a retainer assembly 26 in accordance with one embodiment of the present invention includes a retainer 28 having a base 28a and a plurality of members 28b, 28c, 28d, 28e projecting from the base to define a plurality of associated cavities 29, 30, 31, and 32 therebetween for receiving therein portions of the differential assembly as described below, whereby the retaining device is secured to the differential assembly. As seen in FIG. 5, members 28b and 28c and members 28d and 28e define associated cavities 30 and 31 for receiving and securing therein portions of pinion shaft 54. Also as seen in FIGS. 2-5, members 28b and 28d and members 28c and 28e straddle ends of associated ones of axle shafts 20 and define associated cavities 29 and 32 for receiving and securing therein shims 36 and 34 (described in greater detail below).

In one embodiment, retainer 28 is applied to pinion shaft 54 using a snap fit. One or more of members 28b, 28c, 28d, 28e are resiliently deflectable and have detent surfaces 33 formed thereon so that application of the retainer 28 to pinion shaft 54 in the direction A shown in FIG. 6 causes the pinion shaft 54 to deflect the resiliently deflectable members outwardly. After the pinion shaft is inserted into the cavities 30 and 31 past the detent features 33 and past a point where a dimension d separating the members 28b and 28c and members 28d and 28e is less than the pinion shaft diameter, the deflected member(s) snap back to a point where detent or retention features formed along the relatively narrowly spaced portions of members 28b and 28c and members 28d and 28e will tend to prevent withdrawal of the pinion shaft from cavities 30 and 31, thereby trapping the pinion shaft within cavities 30 and 31 and securing the retainer to the pinion shaft. Depending on the diameter of pinion shaft 54 compared to the spacing between the members 28b and 28c and members 28d and 28e at their relatively narrowly spaced portions, the members may be in either a deflected state or an undeflected state when attached to pinion shaft 54. Other types of interference fits and securement mechanisms are also contemplated for attaching retainer 28 to the pinion shaft.

From FIGS. 2 and 3, it may be seen that a spacing between portions of members 28c and 28e is specified such that these portions of the members and/or a portion of base 28a reside adjacent a respective C-washer 62 and are interposed between the C-washer and the pinion shaft when retainer 28 is mounted on pinion shaft 54. This prevents the C-washer from coming out of recess 59 and off of shaft 20 in the event that the axial play of shaft 20 increases to a point where a distance between shaft second shoulder 66 and face 69 of bevel gear 56 becomes greater than the thickness of the C-washer. This condition may arise from, for example, wear between the pinion shaft and a shim or spacer (not shown) positioned between the axle shaft and the pinion shaft during operation of the differential mechanism.

The retainer provides a means for positioning shim 34 and 36 between an end of an associated axle shaft and the pinion shaft. As seen FIGS. 2, 3, and 7, a first spacer or shim 34 is positioned between members 28b and 28d a second shim 36 is positioned between members 28c and 28e. In a particular embodiment, either or both of shims 34 and 36 are secured between respective pairs of members 28b, 28d and 28c, 28e using an interference fit formed between the shim and the respective pair of members.

The axial end play of the shaft may be controlled by specifying a suitable thickness of the shim. If desired, axial end play of the shaft can be eliminated as shown in FIGS. 2 and 3, by specifying a thickness of shim that occupies the entire clearance between the axially innermost surface of the shaft and the axially outermost surface of the shim facing the shaft.

Figure 8:
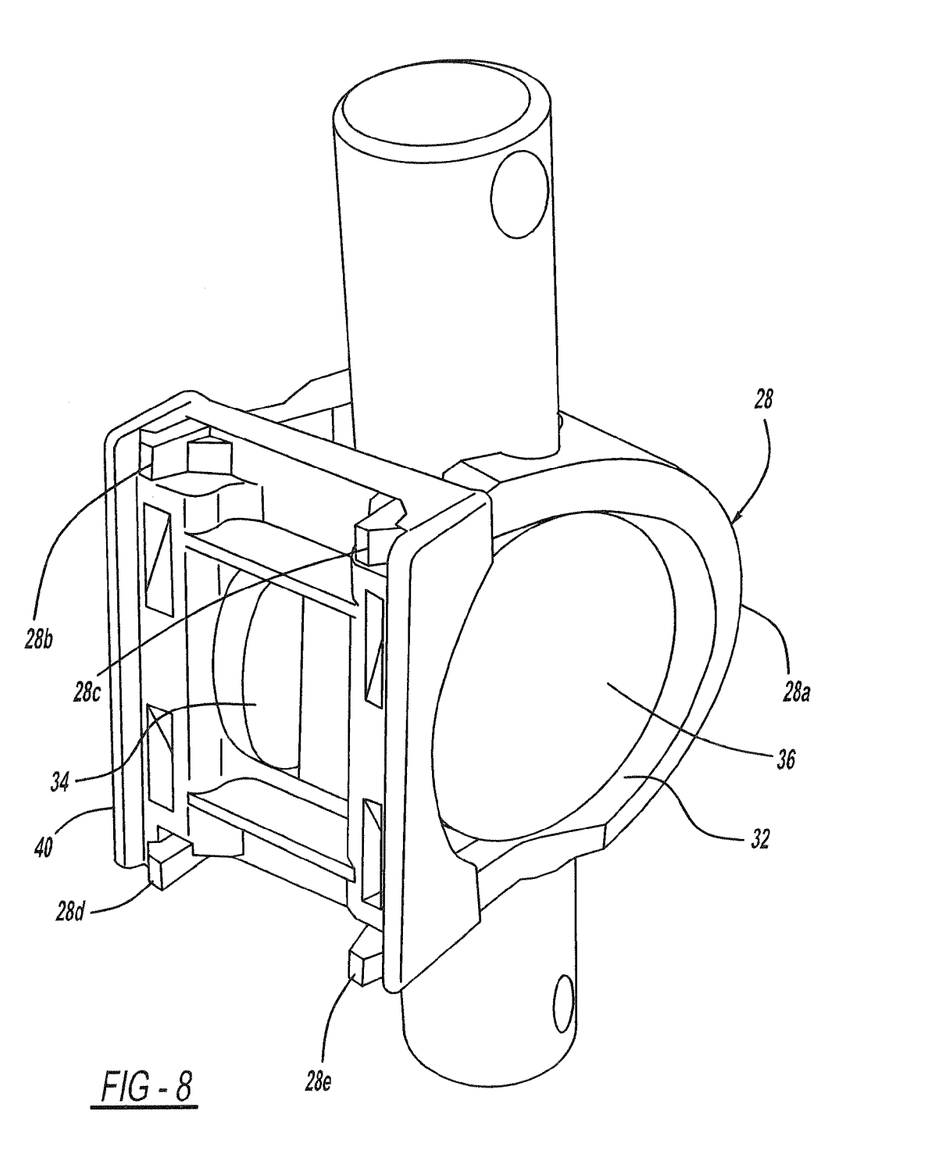
FIG. 8 is the perspective view of FIG. 7 showing a locking member attached to the retainer for securing the retainer to the pinion shaft.
Figure 9:
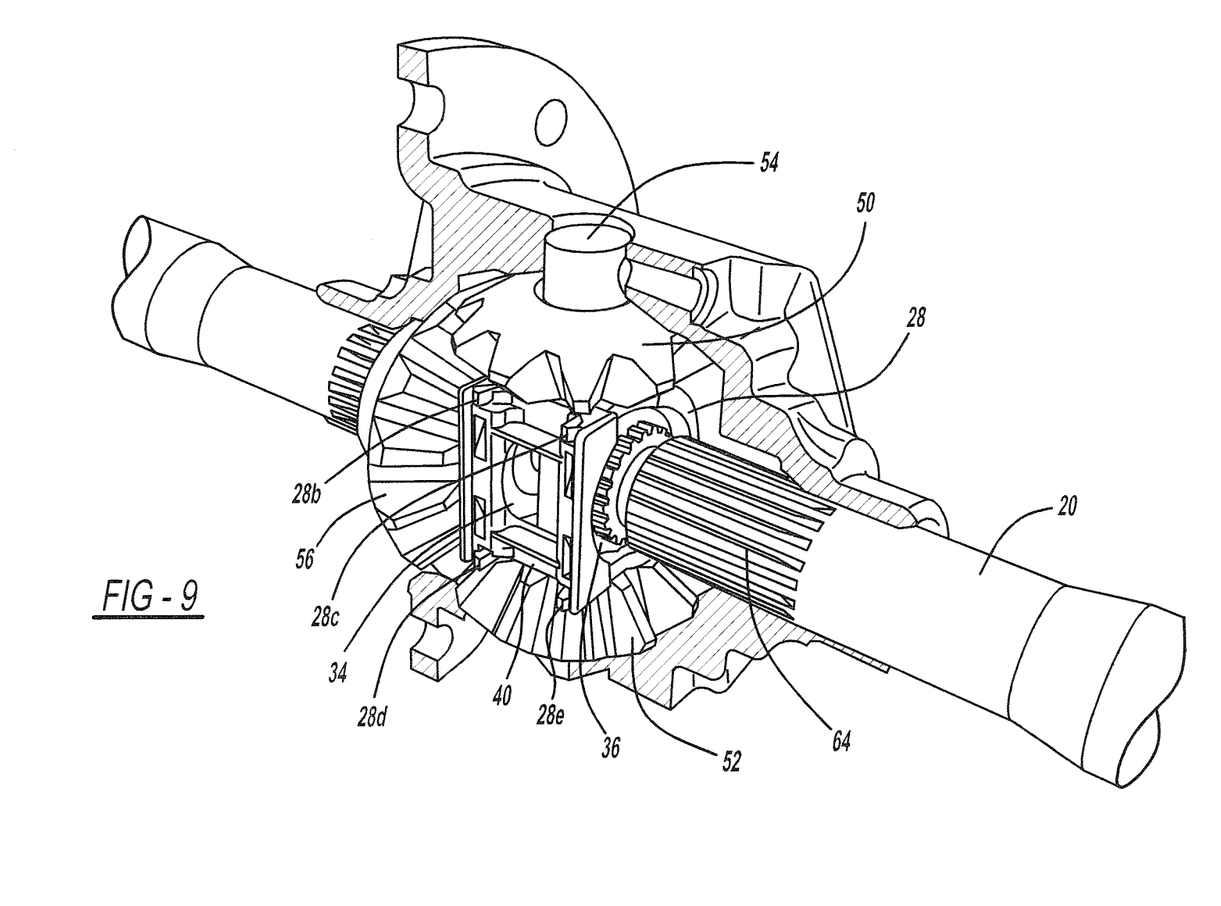
FIG. 9 shows the sub-assembly of FIG. 8 incorporated into a differential assembly.

As shown in FIG. 8, once the shims 34 and 36 are in place, a retainer cover or locking member 40 is applied to an open face of the retainer 28 and secured to the retainer using a snap fit or other mechanism, thereby securing the retainer assembly 26 to the pinion shaft 22. Locking member 40 is configured to mate with or engage complementary features (for example, latches) on retainer 28. Alternatively, the locking member may be attached to the retainer 28 using screws, bolts, or other fasteners. Other methods of attaching the locking member to the retainer are also contemplated. Locking member 40 may be detachably connected to retainer 28 to facilitate disassembly of the retaining device for replacement of the shims, for example. When the locking member 40 is secured to retainer 28, each of the shims 36 and 38 is secured between a pair of opposing members 26b, 26c, 26d, and 26e and between shaft end face 68 and pinion shaft 54.

The embodiments of the mechanism disclosed herein enable control or elimination of axial endplay in the shafts, and help ensure that the C-washers or other retaining members securing the shaft within the differential assembly remain within the recesses formed in their respective side bevel gears, even during axial movement of the axle shaft due to shaft endplay. Also, in a differential assembly where the end surface of the axle shaft is worn and the axle shaft end play undesirably increased due to rubbing of the axle shaft against the pinion shaft, a retaining device including a shim or spacer in accordance with an embodiment of the present invention may be installed to compensate for the shaft end surface wear. This reduces shaft end play without the need to disassemble the entire axle assembly.

In yet another aspect of the embodiments of the present invention, a method of installing the retaining device 26 within a pre-existing axle assembly 10 is described. In a first step, the oil is drained from the housing 12. Next, a retainer assembly 26 is provided, as described above. Next, a rear cover of the differential housing 12 is removed. Next, the retainer 28 is applied to the exposed pinion shaft 22. Each of shims 34 and 36 is then inserted between respective pairs of members 28b, 28c, 28d, 28e and also between the pinion shaft 22 and a respective axle shaft 20. The retainer locking member 40 is then snap fit into place, thereby securing the retainer 28 and the shims 34 and 36 on the pinion shaft. Finally, the rear cover of the differential housing 12 is reinstalled and the housing 12 is filled with oil.

The elements of the retainer assembly 26 are made from a durable and tough material such as a metal, a polymer, or another suitable material. The shims are also made from a durable and tough material such as a metal or other suitable material. All other constituents of the axle assembly 10 are made with known materials and in a known manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A device for restricting movement of an axle shaft retaining member along an axle shaft, the device comprising a retainer including a base and a plurality of members extending from the base for positioning the device on a pinion shaft adjacent the retaining member; and a locking member configured for attachment to the retainer after the retainer is positioned on the pinion shaft, to secure the device to the pinion shaft.

2. A device for restricting movement of an axle shaft retaining member along an axle shaft, the device comprising a retainer including a base and a plurality of members extending from the base for coupling the device to the axle shaft adjacent the retaining member, wherein the plurality of members is configured for attaching the retainer to a pinion shaft received between members of the plurality of members, and wherein at least a portion of the members of the plurality of members is configured for positioning between the retaining member and the pinion shaft when the device is attached to the pinion shaft.

3. A device for restricting movement of an axle shaft retaining member along an axle shaft, the device comprising a retainer including a base and a plurality of members extending from the base for coupling the device to the axle shaft adjacent the retaining member, at least a portion of the members of the plurality of members being configured for receiving a spacer therebetween for controlling a distance between the axle shaft and a pinion shaft coupled to the axle shaft.

4. A method for controlling axial end play of an axle shaft in a differential mechanism, comprising the steps of:
providing means for positioning a spacer between an end of the axle shaft and a pinion shaft positioned opposite the axle shaft end, the means being mountable on the pinion shaft;
providing a spacer configured for positioning in the positioning means;
mounting the positioning means on the pinion shaft;
positioning the spacer in the positioning means;
providing a locking member securable to the positioning means to secure the spacer in the positioning means;
securing the locking member to the positioning means.

5. The method of claim 4 wherein the step of providing a spacer comprises the step of providing a spacer dimensioned so as to occupy an entire distance between the pinion shaft and the axle shaft when the axle shaft end resides in an axially outermost position.

6. An axle assembly comprising:
a bevel gear;
an axle shaft extending into the bevel gear;
a pinion shaft spaced apart from the axle shaft along an axis of the axle shaft;
an axle shaft retaining member positioned in a recess in the bevel gear for controlling movement of the axle shaft along the axle shaft axis; and
a device mounted on the pinion shaft for retaining the retaining member in the recess.

7. The axle assembly of claim 6 wherein the device comprises a base and a plurality of members extending from the base for attaching the device to the pinion shaft, and wherein at least one of the base and at least one member of the plurality of members is positioned opposite the retaining member to prevent movement of the retaining member out of the recess.

8. The axle assembly of claim 7 further comprising a spacer positioned in the retainer between the pinion shaft and an end of the axle shaft for preventing contact between the pinion shaft and the axle shaft.

9. The device of claim 1 wherein the locking member is structured to engage each member of the plurality of members.

10. The device of claim 9 wherein the locking member has an opening structured to receive therein an associated end portion of each member of the plurality of members.

* * * * *